METHOD OF SELECTIVE DIFFUSION FROM IMPURITY SOURCE

Filed Aug. 20, 1963

INVENTORS

BY

ATTORNEY

United States Patent Office
3,290,189
Patented Dec. 6, 1966

3,290,189
METHOD OF SELECTIVE DIFFUSION FROM IMPURITY SOURCE

Masatoshi Migitaka, Kitatama-gun, Tokyo, Hiroshi Kodera, Ota-ku, Tokyo, Hiroshi Ueda, Suginami-ku, Tokyo, and Hirokazu Kimura, Nukiiminami-cho, Koganei-shi, Tokyo, Japan, assignors to Hitachi, Ltd., Chiyoda-ku, Tokyo, Japan, a corporation of Japan Filed Aug. 20, 1963, Ser. No. 303,287
Claims priority, application Japan, Aug. 31, 1962, 37/37,138
2 Claims. (Cl. 148—188)

The present invention relates to a method of selective diffusion from an impurity source deposited on the surface.

Hitherto, when a P-N junction is made by a diffusion method, it is usual to utilize the following methods:

(1) A method in which a solution containing impurities to be diffused is painted on a semiconductor base material, the whole specimen is heated and the impurities are diffused into the material, (2) a method in which the impurities are evaporated or plated on the specimen and are diffused thermally into said specimen, (3) a method in which impurities are diffused into the specimen from the vapor phase.

However, in the paint-on method, the precise control of the size of a P-N junction is difficult, because in the ordinary resistive heating or the inductive heating, the whole base material or a large area of the base material is heated. In this method, not only it is difficult to paint impurities on a small area, but also the impurities are diffused to some extent in the region where they are not painted. In the evaporation method, by evaporating a diffusant locally using an elaborate mask, and in the vapor phase diffusion method, by utilizing a certain oxide film which inhibits a kind of diffusant to diffuse, it is possible to diffuse a diffusant locally. Though in these two methods, it is possible to diffuse impurities locally, the process is extremely complicated compared with the paint-on method.

The characteristic feature of this invention is to diffuse the diffusant from impurity source deposited on the surface thermally by making use of an electron beam. That is in this invention, by depositing two kinds of impurities for donor and acceptor simultaneously and varying the temperature locally, it is possible that these two impurities are diffused selectively a P-N junction is formed. After diffusion, the deposited impurities on the undesired region are removed by any proper method.

The objects and advantages of this invention are that the control of deposited area is unnecessary and therefore no masks are needed, and that as the diffusion is limited within the heated region, the impurities are diffused only in the desired area. In the production of transistors, the process is simplified, because there is no need to make use of an oxide film, so as to inhibit impurities from diffusing into the undesired area.

Figure 1:
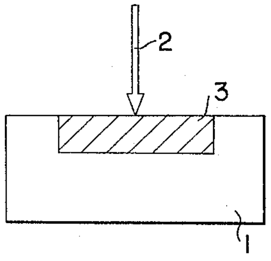
Figure 2:
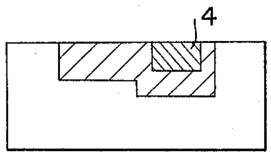
Figure 3:
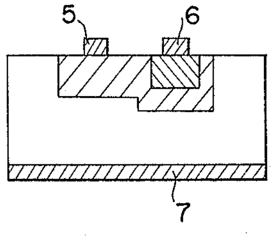

With these and other objects in view, which will become apparent in the following detailed description, the present invention will be clearly understood in connection with the accompanying drawings, in which:

FIGURES 1 through 3 are diagrams showing some manufacturing steps of a preferred embodiment of the selective diffusion method.

Now, the present invention will be explained by means of a preferred embodiment of the present invention.

Referring now to the drawing and in particular to FIG. 1, there is shown a P-type base material 1 which is 1 mm. in thickness, 20 mm. in diameter and has resistivity of 1 ohm-cm. Over its whole surface, a solution comprising a mixture of ethylene glycol monomethyl ether, metaboric acid and phosphorus pentoxide is painted. An area of $210\mu$ in width and $300\mu$ in length on the painted surface is heated to 1000° C. by an electron beam 2 for four hours, then a N-type layer 3 is formed, which contains phosphorus having a surface concentration of $7\times10^{19}$ cm.$^{-3}$ and boron having a surface concentration of $3\times10^{19}$ cm.$^{-3}$ and whose thickness is $7\mu$. Next, an area of $100\mu$ in width and $300\mu$ in length on the N-type layer is again heated to 1200° C. by an electron beam for 25 minutes, then the surface concentrations of phosphor and boron are changed to $7\times10^{19}$ cm.$^{-3}$ and $15\times10^{19}$ cm.$^{-3}$, respectively, and a P-type layer 4 a thickness of $6\mu$ is formed, as shown in FIG. 2. Though in this case, the N-type layer slightly is diffused into the base material and the temperature rises only on the surface because of the electron beam heating, the position of a P-N junction is almost unchanged. When the formation of a P-N junction is accomplished, the silicon base material is immersed into ethylene glycol monomethyl ether to remove the residual diffusion source and is washed by a hydrofluoric acid (HF) to remove the vitreous layer on the heated area. When electrodes 5, 6 and 7 are attached, as shown in FIG. 3, a silicon mesa transistor is formed.

While the invention has been described in conjunction with a preferred embodiment, it will be understood that we do not intend to limit to the embodiment shown but on the contrary, intend to cover the various alternatives and equivalent constructions included within the spirit and scope of the appended claims. The present invention may be applied to any combination of various semiconductors and impurities which satisfy the above mentioned Equations 1 to 4.

Having now described the invention, what is claimed as new and novel and for which it is desired to secure by Letters Patent is:

1. The process for making a P-type silicon semi-conductor comprising (i) coating a surface of the base of a silicon crystal with a solution of ether, metaboric acid and phosphorus pentoxide;

(ii) heating an area of said coated surface to a temperature of about 1000° C. for a sufficient time to convert a portion of the surface of said crystal into an N-type conductivity zone wherein the phosphorus donor element predominates; and (iii) then heating a portion of said converted surface to a temperature of about 1200° C. for a sufficient time to convert a portion of said N-type conductivity zone into a P-type conductivity zone wherein boron atoms predominate as the impurity, and concomitantly causing said portion of said N-type conductivity zone formally at the surface to diffuse deeper into the original crystal beneath the subsequently formed P-type conductivity zone.

2. The process of claim 1 wherein said heating is accomplished by directing an electron beam at the specified areas of said crystal.

References Cited by the Examiner

UNITED STATES PATENTS

| | | | |
|---|---|---|---|
| 2,725,315 | 11/1955 | Fuller | 148—186 |
| 2,793,145 | 5/1957 | Clarke | 148—190 |
| 2,816,847 | 12/1957 | Shockley | 148—1.5 |
| 2,845,371 | 7/1958 | Smith | 148—1.5 |
| 2,968,723 | 1/1961 | Steigerwald | 75—65 |
| 3,067,485 | 12/1962 | Ciccolella | 148—186 |
| 3,145,126 | 8/1964 | Hardy | 148—186 |

HYLAND BIZOT, *Primary Examiner.*

BENJAMIN HENKIN, *Examiner.*

H. W. CUMMINGS, *Assistant Examiner.*